United States Patent [19]

El-Hamamsy et al.

[11] Patent Number: 5,084,654
[45] Date of Patent: * Jan. 28, 1992

[54] STARTING AID FOR AN ELECTRODELESS HIGH INTENSITY DISCHARGE LAMP

[75] Inventors: Sayed-Amr A. El-Hamamsy, Schenectady; Victor D. Roberts, Burnt Hills, both of N.Y.

[73] Assignee: General Electric Company, Schenectady, N.Y.

[*] Notice: The portion of the term of this patent subsequent to Sep. 10, 2008 has been disclaimed.

[21] Appl. No.: 527,503

[22] Filed: May 23, 1990

[51] Int. Cl.$^5$ .............................................. H05B 41/24
[52] U.S. Cl. .................................... 315/248; 315/344; 313/234
[58] Field of Search ................. 315/248, 39, 111.51, 315/267, 344, 283; 313/151, 638, 161

[56] References Cited

U.S. PATENT DOCUMENTS

| 4,810,938 | 3/1989 | Johnson et al. | 315/248 |
| 4,812,702 | 3/1990 | Anderson | 313/153 |
| 4,894,589 | 2/1990 | Borowiec | 315/248 |
| 4,894,590 | 2/1990 | Witting | 315/248 |
| 4,902,937 | 2/1990 | Witting | 315/248 |
| 4,959,582 | 9/1990 | Anderson | 315/248 |
| 4,982,140 | 1/1991 | Witting | 315/248 |

Primary Examiner—Eugene R. Laroche
Assistant Examiner—Amir Zarabian
Attorney, Agent, or Firm—Jill M. Breedlove; James C. Davis, Jr.; Marvin Snyder

[57] ABSTRACT

A starting aid for an electrodeless high intensity discharge (HID) lamp comprises at least one starting electrode which, at least during lamp starting, is situated adjacent to, and preferably in contact with, the portion of the arc tube nearest the arc discharge and oriented so as to provide a capacitive starting current that flows in substantially the same location as the arc discharge, thereby easing the transition from a relatively low current glow discharge to a relatively high current, high intensity discharge. The starting aid comprises one or more conductors that substantially conform to the shape of the arc tube at least during initiation of the arc discharge. After the lamp is started, the starting aid may be moved to a predetermined location away from the arc tube. Alternatively, the starting aid may comprise one or more fixed starting electrodes. The starting aid may be coupled to the lamp ballast circuit used to drive the excitation coil either directly, or via an impedance network, or via the excitation coil. In an alternative embodiment, the starting aid is excited by a starting circuit that is separate and independent from, and operates at a substantially higher frequency than, the lamp ballast.

20 Claims, 4 Drawing Sheets

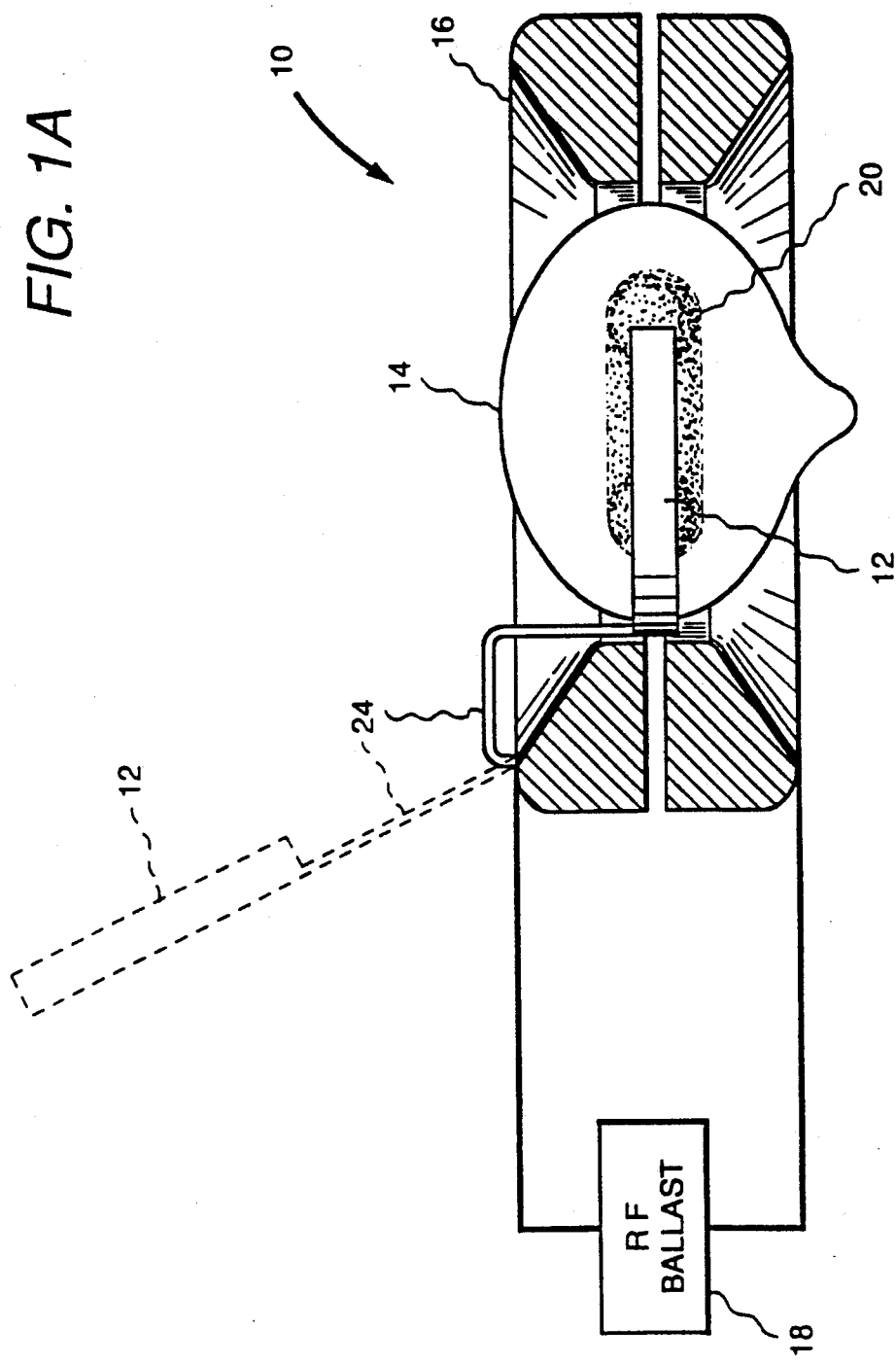

STARTING AID FOR AN ELECTRODELESS HIGH INTENSITY DISCHARGE LAMP

RELATED PATENT APPLICATIONS

This patent application is related to U.S. patent application of S. A. El-Hamamsy and R. J. Thomas, entitled "A Starting Circuit for an Electrodeless High Intensity Discharge Lamp", Ser. No. 527,500 and to U.S. patent application of V. D. Roberts, S. A. El-Hamamsy and R. J. Thomas, entitled "A Starting Aid for an Electrodeless High Intensity Discharge Lamp", Ser. No. 527,502. The aforementioned patent applications, which are incorporated herein by reference, are each assigned to the instant assignee and filed concurrently herewith.

1. Field of the Invention

The present invention relates generally to high intensity discharge (HID) lamps. More particularly, the present invention relates to an improved starting aid for an electrodeless HID lamp.

2. Background of the Invention

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1990, and assigned to the instant assignee, which patent is hereby incorporated by reference. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

A spiral starting electrode for an electrodeless HID lamp is described in U.S. Pat. No. 4,894,590 of H. L. Witting, issued Jan. 16, 1990, and assigned to the instant assignee, which patent is hereby incorporated by reference. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high voltage signal which results in a sufficiently high electric field gradient to create a glow discharge in the arc tube. A bimetallic strip is utilized to move the starting electrode away from the arc tube after an arc discharge is initiated therein.

Starting electrodes which are moved from a rest position to a starting location adjacent to the arc tube by piezoelectric means are described in U.S. Pat. No. 4,894,589 of J. C. Borowiec, issued Jan. 16, 1990, and assigned to the instant assignee, which patent is hereby incorporated by reference. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned, U.S. Pat. No. 4,982,140 of H. L. Witting, issued January, 1991, another starting aid for an electrodeless HID lamp is described which comprises a first conductive coil disposed about a second conductive coil, each coil having a truncated-cone shape. The coils are wound in opposite directions so that voltages induced therein add together to provide a sufficiently high electric field gradient to initiate an arc discharge in the arc tube. A bimetallic support is used to move the starting aid between a starting position adjacent to the arc tube and a lamp-operating position at a predetermined location away from the arc tube. The Witting application is hereby incorporated by reference.

Although each of the hereinabove starting aids is effective in initiating an arc discharge in an electrodeless HID lamp, it may be desirable in some applications to improve the starting capability of an electrodeless HID lamp even further by easing the transition from low current glow discharge to high current, high intensity, solenoidal discharge.

OBJECTS OF THE INVENTION

Accordingly, it is an object of the present invention to provide a new and improved starting aid for an electrodeless HID lamp.

Another object of the present invention is to provide a starting aid for an electrodeless HID lamp which generates a capacitive starting current that flows in substantially the same location as the arc discharge to be initiated, thereby easing the transition from a relatively low current glow discharge to a high current, high intensity arc discharge.

Still another object of the present invention is to provide a starting aid for an electrodeless HID lamp which comprises one or more starting electrodes suitably configured so as to ensure breakdown of gas only within the arc tube of the lamp.

SUMMARY OF THE INVENTION

In accordance with the present invention, the new and improved starting aid for an electrodeless HID lamp comprises a starting electrode disposed proximate the portion of the arc tube nearest the arc discharge to be initiated and oriented so as to provide a capacitive starting current that flows in substantially the same location as the arc discharge, thereby easing the transition from a relatively low current glow discharge to a high current, high intensity discharge. In a preferred embodiment, the starting aid comprises at least one conductor which conforms to the arc tube and which is disposed adjacent thereto during initiation of the arc discharge and is thereafter moved to a predetermined location away from the arc tube. Alternatively, the starting aid may comprise one or more fixed starting electrodes which likewise conform to the arc tube and are disposed adjacent thereto during initiation of the arc discharge.

A single starting electrode according to the present invention has a gap between the ends thereof which is of a size that is sufficiently large to avoid breakdown of gas between the ends of the conductor and between the electrode and the excitation coil (i.e. outside the arc tube), while still small enough to ensure breakdown of the fill within the arc tube. Similarly, for a starting aid comprising two conductors, the ends of the conductors are separated by an amount that ensures breakdown of gas only within the arc tube.

The starting aid may be electrically coupled to the radio frequency power supply used to drive the lamp either directly, or via an impedance network, or via the excitation coil. Alternatively, the starting aid may be coupled to a radio frequency starting circuit that is separate and independent from the radio frequency power supply used to drive the excitation coil of the HID lamp.

BRIEF DESCRIPTION OF THE DRAWINGS

The features and advantages of the present invention will become apparent from the following detailed description of the invention when read with the accompanying drawings in which:

FIG. 1A is a partially cutaway side view of an electrodeless HID lamp employing a starting aid in accordance with a preferred embodiment of the present invention;

DETAILED DESCRIPTION OF THE INVENTION

Figure 1B:
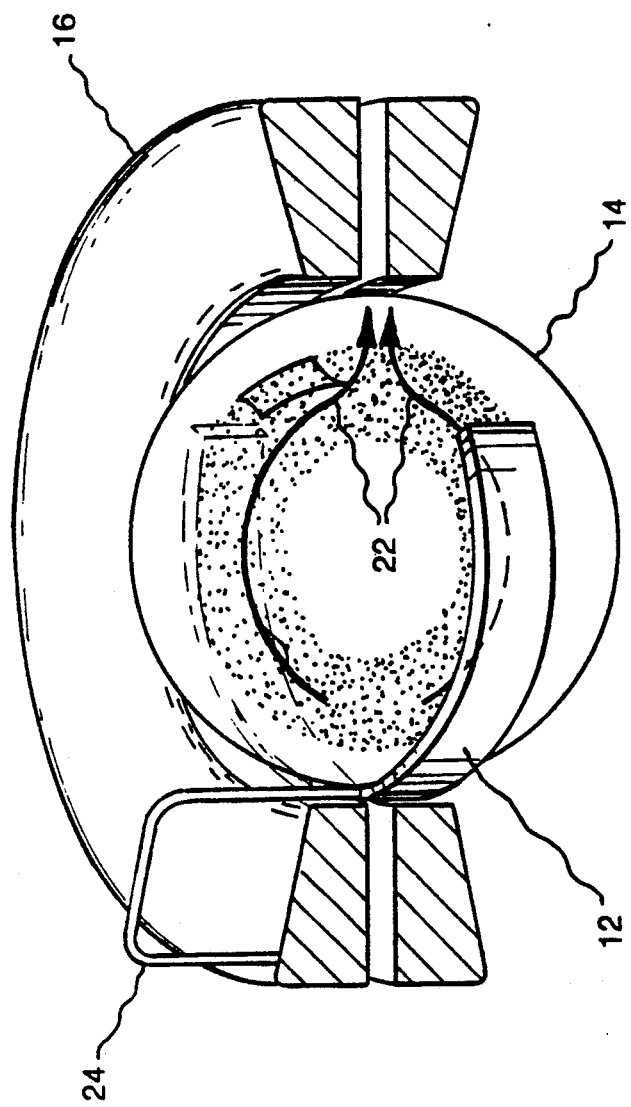
FIG. 1B is a cutaway isometric view of the electrodeless HID lamp of FIG. 1A.

FIG. 1 illustrates an electrodeless HID lamp 10 employing a starting aid 12 in accordance with a preferred embodiment of the present invention. Lamp 10 includes an arc tube 14 preferably formed of a high temperature glass, such as fused quartz, or an optically transparent ceramic, such as polycrystalline alumina. An excitation coil 16 surrounds arc tube 14 and is coupled to a radio frequency (RF) ballast 18 for exciting a toroidal arc discharge 20 therein. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which the arc discharge having a substantially toroidal shape is excited during lamp operation. A suitable fill is described in U.S. Pat. No. 4,810,938 of P. D. Johnson, J. T. Dakin and J. M. Anderson, issued on Mar. 7, 1989, and assigned to the instant assignee. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in U.S. Pat. No. 4,972,120 of H. L. Witting, issued Nov. 20, 1990 and assigned to the instant assignee, which patent application is hereby incorporated by reference. The fill of the Witting application comprises a combination of a lanthanum halide, a sodium halide, a cerium halide and xenon or krypton as a buffer gas. For example, a fill according to the Witting application may comprise a combination of lanthanum iodide, sodium iodide, cerium iodide, and 250 torr partial pressure of xenon.

As illustrated in FIG. 1A, RF power is applied to the HID lamp by RF ballast 18 via excitation coil 16 coupled thereto. Excitation coil 16 is illustrated as comprising a two-turn coil having a configuration such as that described in commonly assigned, copending U.S. patent application of G. A. Farrall, Ser. No. 493,266, filed Mar. 14, 1990, which patent application is hereby incorporated by reference. Such a coil configuration results in very high efficiency and causes only minimal blockage of light from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is hereby incorporated by reference. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself.

Current flows through the fill within arc tube 14 as a result of this solenoidal electric field, producing toroidal arc discharge 20 therein. Suitable operating frequencies for RF ballast 18 are in the range from 0.1 to 30 megahertz (MHz), an exemplary operating frequency being 13.56 MHz.

Figure 2:
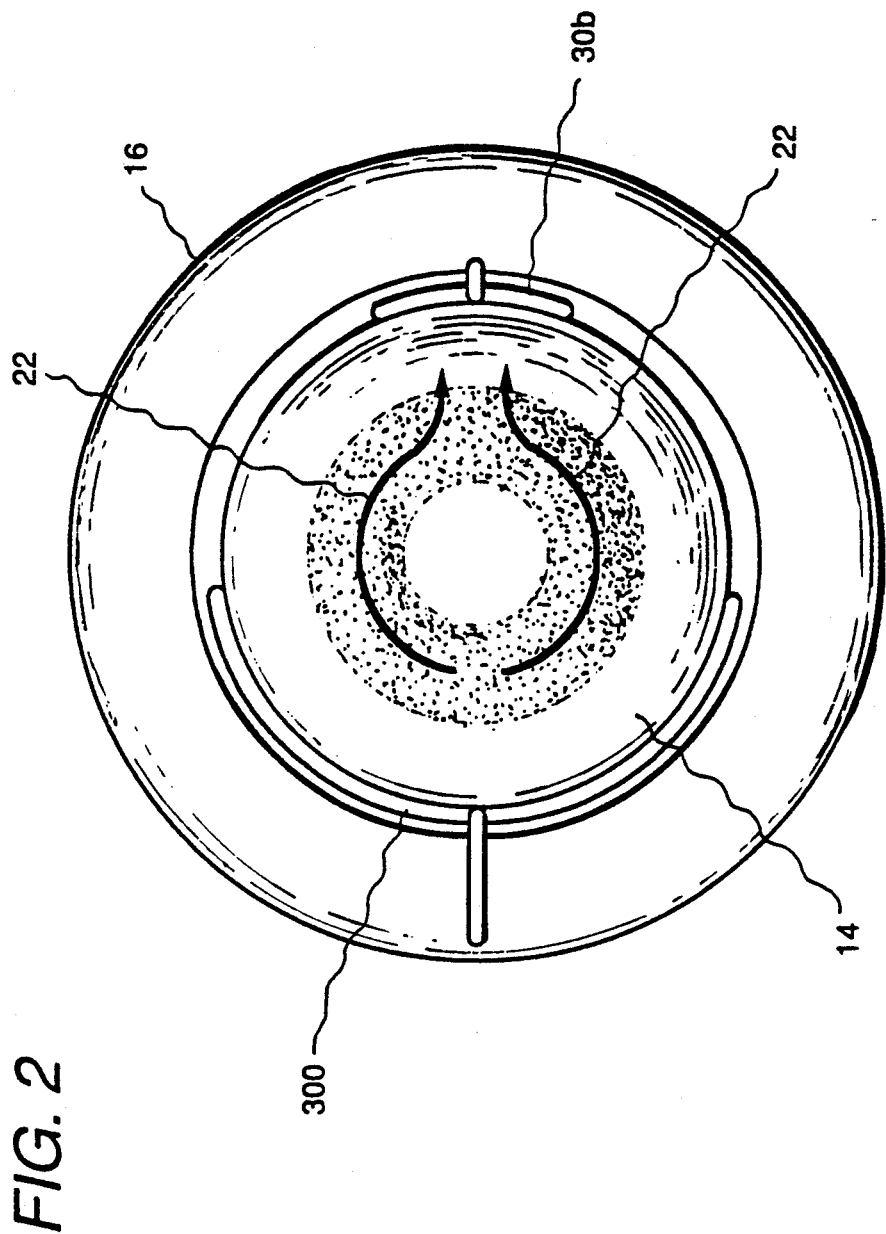
FIG. 2 is a top view of an electrodeless HID lamp employing a starting aid in accordance with an alternative embodiment of the present invention.

Starting aid 12 is illustrated in FIG. 1 as comprising a single electrode situated adjacent to the portion of arc tube 14 nearest the toroidal arc discharge during the initiation thereof. The electrode preferably has a gap therein so as to avoid formation of a completed turn which would otherwise result in the existence of a secondary coil having a high circulating current therein. Moreover, starting aid 12 may comprise more than one suitably curved electrode of the same or different lengths, that are positioned with a gap therebetween (such as starting aids 30a-30b and 36a-36b of FIGS. 2 and 3, respectively). The gap between the ends of one or more starting electrodes should be of a sufficiently large size so that breakdown does not occur between the ends of the electrodes or between the electrodes and the excitation coil.

In operation, when an RF signal is applied to starting electrode 12, a capacitive starting current is initiated in arc tube 14 which acts to ionize the gaseous fill therein, thus producing a relatively low current glow discharge. The capacitive starting current is represented by arrows 22 in FIGS. 1B and 2. Once the fill is sufficiently ionized, the glow discharge transitions to a relatively high current, high intensity solenoidal arc discharge. Advantageously, the capacitive starting current generated by the starting aid of the present invention flows in substantially the same location as the arc discharge, thus making the aforesaid transition easier and hence occur substantially instantaneously. As another advantage, by positioning starting aid 12 in such close proximity to arc tube 14 during lamp starting, breakdown of the fill contained within arc tube 14 is ensured, while breakdown of any gas outside the arc tube is avoided.

After arc discharge 20 is initiated, starting electrode 12 may be moved to a predetermined location away from arc tube 14, if desired. In this way, starting electrode 12 does not substantially block light emission, interfere with the thermal balance of the arc tube, or contribute to arc tube degradation. An electrode moving means 24 may comprise, for example, a heat sensitive support which is suitably curved at normal ambient temperatures to cause starting electrode 12 to lie adjacent to the surface of arc tube 14. An exemplary heat sensitive support comprises a bimetal strip which undergoes differential expansion in response to the receipt of heat energy. In particular, when arc tube 14 becomes sufficiently hot after initiation of the high intensity arc discharge therein, the curvature of the bimetal strip changes so as to move starting electrode 12 away from the arc tube (as shown in phantom in FIG. 1A). After lamp operation ceases and the arc tube cools sufficiently, the bimetal strip assumes its original shape, moving the starting electrode back to the starting position adjacent to arc tube 14.

In an alternative embodiment, electrode moving means 24 comprises a piezoelectric bender responsive to an actuating DC voltage for moving the starting aid between the lamp-starting and lamp-operating positions. In particular, when the actuating voltage is applied to the piezoelectric bender, the starting electrode is moved to the starting position adjacent to the arc tube. The actuating voltage is reduced or removed once the arc discharge is initiated, and the starting electrode is moved back to its original position, i.e. the lamp-operating position. Such a piezoelectric bender is described in U.S. Pat. No. 4,894,589 of J. C. Borowiec, cited hereinabove.

Figure 3:
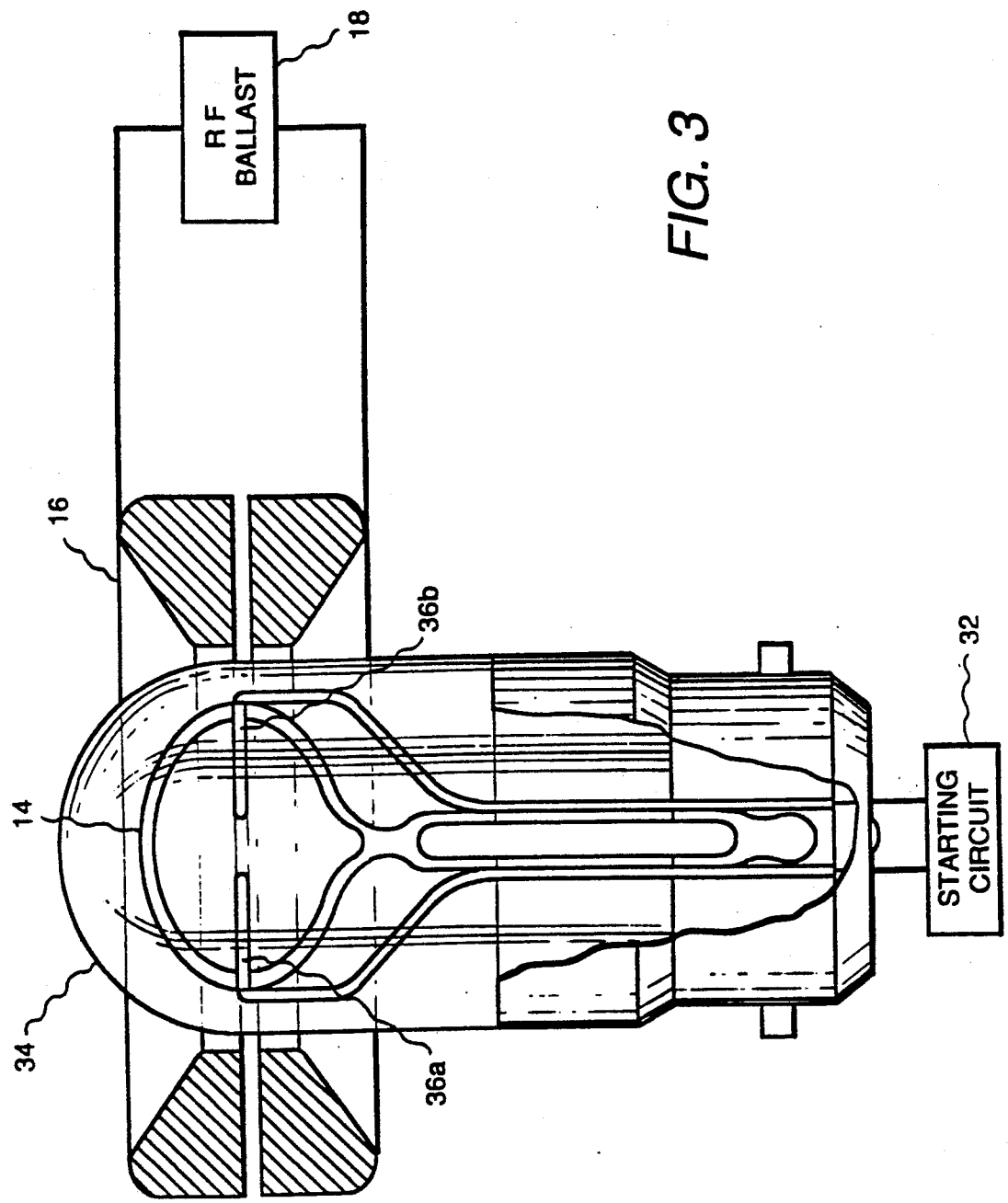
FIG. 3 is a partially cutaway side view of an electrodeless HID lamp employing a starting aid in accordance with another alternative embodiment of the present invention.

FIG. 3 illustrates an electrodeless HID lamp employing a starting aid 36a-36b in accordance with another preferred embodiment of the present invention wherein a starting circuit 32, which is separate and independent from RF ballast 18, is used to excite the starting aid. As shown, arc tube 14 is preferably enclosed by an evacuated outer envelope 34, and excitation coil 16 surrounds the envelope in the vicinity of the arc tube. By way of example, in FIG. 3, the starting aid is illustrated as comprising two fixed, curved electrodes 36a and 36b of the same length situated on portions of arc tube 14 nearest arc discharge 20 and oriented to provide a capacitive starting current that flows in substantially the same location as the arc discharge, as described hereinabove. (However, it is to be understood that other starting aid configurations in accordance with the present invention, such as the those of FIGS. 1 and 2, may be employed with starting circuit 32 and with or without envelope 34.)

A suitable starting circuit is described in the copending U.S. patent application of S. A. El-Hamamsy and R. J. Thomas, cited hereinabove. In particular, the starting circuit of the El-Hamamsy and Thomas application comprises either a Class-D or Class-E power amplifier having an output resonant circuit tuned to a substantially higher frequency than the operating frequency of the signal provided to the excitation coil by the lamp ballast. For example, with the lamp ballast being driven at 13.56 MHz, a suitable operating frequency for starting circuit 34 is 27.12 MHz. By driving the starting circuit at a substantially higher frequency than the lamp ballast, there is minimal coupling between the starting circuit and the ballast. That is, the tuned circuit of the starting circuit will not be excited by the excitation coil after the starting circuit is deactivated. Such a starting circuit may be used with either a movable or fixed starting aid of the present invention, as desired.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting aid for an electrodeless high intensity discharge lamp which includes an excitation coil situated about an arc tube for exciting an arc discharge in an ionizable fill contained in said arc tube, comprising:
   at least one starting electrode being positioned, at least during initiation of the arc discharge, adjacent to the portion of said arc tube nearest the arc discharge to be initiated therein and oriented so as to provide a capacitive starting current in said arc tube that flows in substantially the same location as the arc discharge, said capacitive starting current and the arc discharge following substantially the same path in said arc tube; and
   means for coupling a radio frequency signal to said starting electrode.

2. The starting aid of claim 1 wherein the shape of said starting electrode substantially conforms to said arc tube at least during initiation of the arc discharge.

3. The starting aid of claim 2 wherein said starting electrode comprises a single conductor having at least one gap therein.

4. The starting aid of claim 2 wherein said starting aid comprises two conductors sufficiently separated so as not to cause breakdown of gas external to said arc tube between the ends of said two conductors.

5. The starting aid of claim 1, further comprising electrode moving means for moving said starting electrode to a predetermined location away from said arc tube after the arc discharge is initiated.

6. The starting aid of claim 5 wherein said electrode moving means comprises heat responsive means for moving said starting electrode to said predetermined location away from said arc tube upon receipt of heat energy from said arc tube, said heat responsive means moving said starting electrode back toward said arc tube upon sufficient reduction in receipt of heat energy from said arc tube.

7. The starting aid of claim 6 wherein said heat responsive means comprises bimetallic support means.

8. The starting aid of claim 5 wherein said electrode moving means comprises piezoelectric bender means for moving said starting electrode adjacent to said arc tube in response to a voltage stimulus, said piezoelectric bender means moving said starting electrode to said predetermined location away from said arc tube upon sufficient reduction in said voltage stimulus.

9. An electrodeless high intensity discharge lamp, comprising:

a light-transmissive arc tube for containing a fill;

an excitation coil disposed about said arc tube and coupled to a radio frequency power supply for exciting an arc discharge in said fill;

at least one starting electrode being positioned, at least during initiation of the arc discharge, adjacent to the portion of said arc tube nearest the arc discharge and oriented so as to provide a capacitive starting current in said arc tube that flows in substantially the same location as the arc discharge, said capacitive starting current and the arc discharge following substantially the same path in said arc tube; and means for coupling a radio frequency signal to said starting electrode.

10. The lamp of claim 9 wherein the shape of said starting electrode substantially conforms to said arc tube at least during initiation of the arc discharge.

11. The lamp of claim 9 wherein said starting electrode comprises a single conductor having at least one gap therein.

12. The lamp of claim 9 wherein said starting aid comprises two conductors sufficiently separated so as not to cause breakdown of gas external to said arc tube between the ends of said two conductors.

13. The lamp of claim 9, further comprising electrode moving means for moving said starting electrode to a predetermined location away from said arc tube after the arc discharge is initiated.

14. The lamp of claim 13 wherein said electrode moving means comprises heat responsive means for moving said starting electrode to said predetermined location upon receipt of heat energy from said arc tube, said heat responsive means moving said starting electrode back toward said arc tube upon sufficient reduction in receipt of heat energy from said arc tube.

15. The lamp of claim 14 wherein said heat responsive means comprises bimetallic support means.

16. The lamp of claim 13 wherein said electrode moving means comprises piezoelectric bender means for moving said starting electrode adjacent to said arc tube in response to a voltage stimulus, said piezoelectric bender means moving said starting electrode to said predetermined location away from said arc tube upon sufficient reduction in said voltage stimulus.

17. The lamp of claim 9 wherein the radio frequency signal coupling means comprises means for coupling said starting electrode to said radio frequency power supply for providing said radio frequency signal thereto.

18. The lamp of claim 17 wherein said means for coupling said starting electrode to said radio frequency power supply comprises means for coupling said starting electrode to said excitation coil.

19. The lamp of claim 9 wherein said radio frequency signal coupling means comprises means for coupling said starting electrode to a second radio frequency power supply for providing said radio frequency signal to said starting electrode, said excitation coil and said starting electrode being separately excited.

20. The lamp of claim 9, further comprising an outer light transmissive envelope enclosing said arc tube, said excitation coil being situated outside said envelope in the vicinity of said arc tube.

* * * * *